Dec. 20, 1966     G. E. METTLER     3,292,299
SPRING ACTUATED FLY SWATTER
Filed Aug. 30, 1965     2 Sheets-Sheet 1
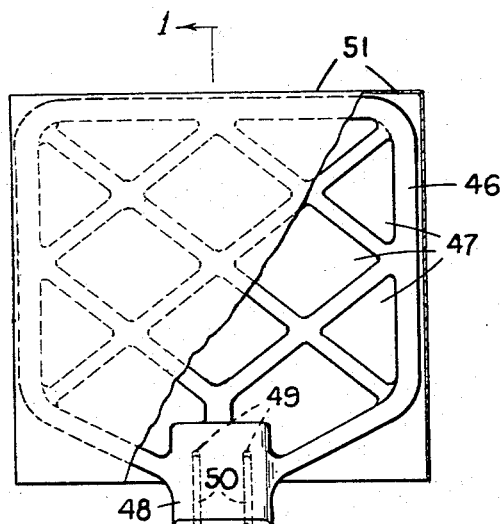
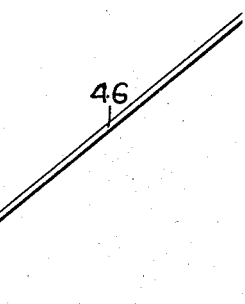
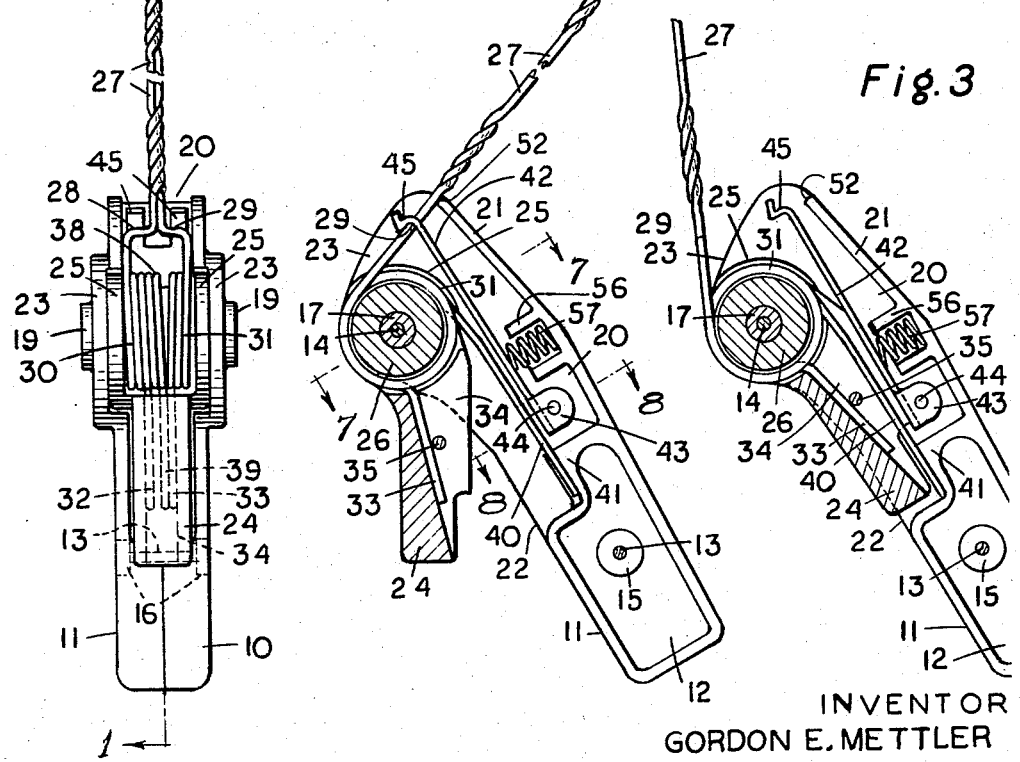
INVENTOR
GORDON E. METTLER
BY
*Fred C. Matheny*
ATTORNEY Dec. 20, 1966   G. E. METTLER   3,292,299
SPRING ACTUATED FLY SWATTER
Filed Aug. 30, 1965   2 Sheets-Sheet 2
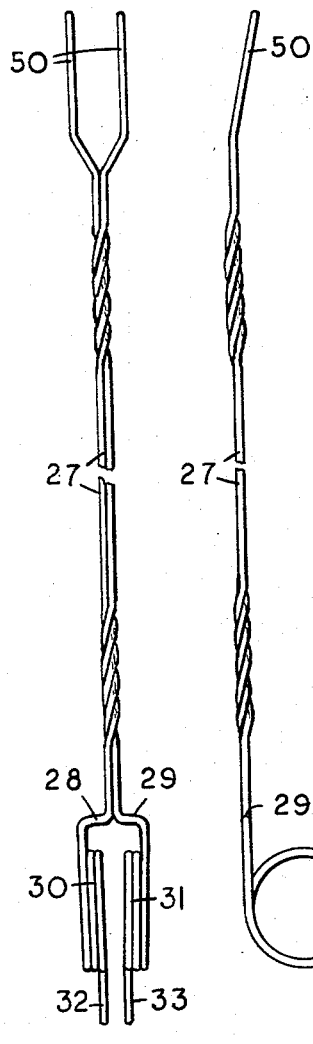
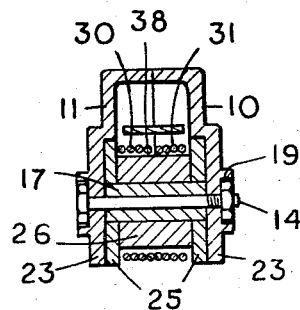
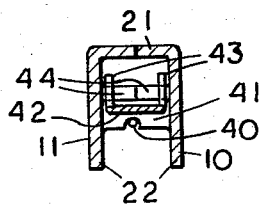
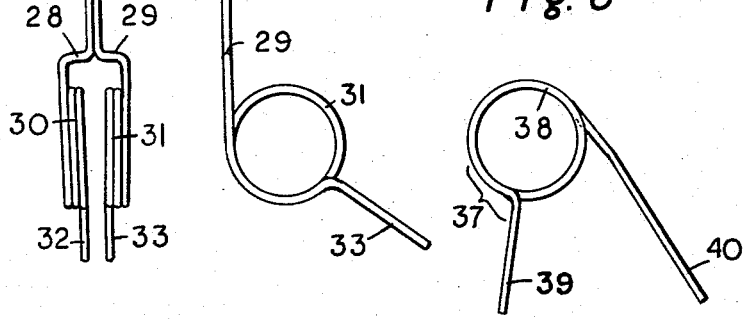
INVENTOR
GORDON E. METTLER
BY
*Fred C. Matheny*
ATTORNEY

United States Patent Office 3,292,299
Patented Dec. 20, 1966

3,292,299
SPRING ACTUATED FLY SWATTER
Gordon E. Mettler, Churchs Ferry, N. Dak. 58325
Filed Aug. 30, 1965, Ser. No. 483,717
6 Claims. (Cl. 43—135)

My invention relates to a spring actuated fly swatter and objects of my invention are to provide a spring actuated fly swatter of simple and inexpensive construction which is easy to use and efficient in swatting flies.

Another object is to provide a fly swatter in which a spring actuated swat arm having a swat pad secured to its outer end is movable between a cocked position and a swatting or striking position and in which said arm normally stands and is held in the cocked position and is automatically returned to the cocked position after each swatting stroke and in which said swat arm and swat pad can always be quickly and easily operated to swat a fly by merely picking up and properly positioning or aiming the swatter and squeezing a trigger on the same.

Another object is to provide a fly swatter in which a swat arm that carries a swat pad and is movable between a cocked position and a swatting position by a spring does not require manual movement to said cocked position and normally is not spring loaded or under spring pressure when in said cocked position.

Another object is to provide disposable envelopes or bags of pliable material shaped and sized to fit snugly over a swat pad of a fly swatter and readily applicable to said pad whereby they may be replaced easily when they become soiled.

Other objects of my invention will be apparent from the following description taken in connection with the accompanying drawings.

In the drawings FIGURE 1 is a view partly in section and partly in elevation, taken substantially on broken line 1—1 of FIG. 2, and showing a fly swatter constructed in accordance with my invention.

FIG. 2 is a front elevational view of said fly swatter.

FIG. 3 is a fragmentary view similar to FIG. 1 but with parts of the device shown in different positions than they are in FIG. 1.

FIG. 4 is a detached edge view of a swat arm having springs formed integral therewith.

FIG. 5 is a front view of the swat arm shown in FIG. 4.

FIG. 6 is a detached view in elevation of a return spring.

FIG. 7 is a view in cross section taken substantially on broken line 7—7 of FIG. 1.

FIG. 8 is a view in cross section taken substantially on broken line 8—8 of FIG. 1.

Like reference numerals refer to like parts throughout the several views.

My fly swatter comprises a combined handle and frame member formed of two parts 10 and 11 which are mates and are of duplicate construction except that they are made right and left. These two parts 10 and 11 are preferably formed of light weight non-corrosive material, such as an aluminum alloy or a durable plastic. The lower end portions of abutting faces of the two handle members 10 and 11 are recessed as indicated by 12 to economize material and minimize weight. Two bolts 13 and 14, positioned respectively in parts of the handle members 10 and 11 herein referred to as the lower and upper end portions of said handle members, secure said handle members 10 and 11 together when the swatter is assembled. The bolt 13 passes through two abutting bosses 15, one of which is shown in FIGS. 1 and 3. Preferably the head and nut of the bolt 13 are positioned in countersunk recesses, indicated by dotted lines 16 in FIG. 2, to leave the outer sides of the lower end portions of the handle members smooth and unobstructed. The upper bolt 14 passes through a sleeve or core pin 17, FIGS. 1, 3 and 7, and preferably the head and nut of said bolt 14 are positioned in suitable countersunk recesses in bosses 19 which are provided on the outer sides of flange parts 23 of the handle members 10 and 11.

The upper portions of the two frame and handle members 10 and 11 are shaped so that they cooperate in forming between them a receptacle 20 having a back wall 21 and two side walls 22, said receptacle being open at the front. The flange parts 23 of the side walls 22 are of greater width than the other parts of said side walls and are transversely offset outwardly, as shown in FIGS. 1 and 7, to afford more space between them.

A trigger member 24 has, on its upper end, two spaced apart flanges 25 which are pivotally mounted on the sleeve 17 and operate between the wider parts 23 of the side walls 22. A tubular cylindrical hub 26, which serves as a spring core, is mounted on the sleeve 17 between the two flanges 25 of trigger member 24.

A swat arm 27, preferably formed of two twisted together pieces of spring wire, has the lower end portions of its two wires bent outwardly at approximately right angles to form two shoulders 28 and 29 and thence bent downwardly and cylindrically to form two transversely spaced apart spring coils 30 and 31. The coils 30 and 31 terminate respectively in two arms or extensions 32 and 33 which extend in a generally downward direction. In their assembled position the coils 30 and 31 are supported on the hub 26 and the arms 32 and 33 lie within the groove 34 in the trigger 24. A cross pin 35 in the trigger 24 extends across the arms 32 and 33 and prevents lost motion between these arms and the trigger 24, particularily at the time the trigger and swat arm 27 are being returned from a swatting position to a cocked position.

A return spring 37, FIG. 6, is composed of a coil 38 and two outwardly protruding arms 39 and 40. The coil 38 is mounted on the hub 26 between the two coils 31 and 30. One arm of said return spring lies in and bears against the bottom of the trigger groove 34 and the other arm 40 thereof bears against a shouldered part 41 of the handle 10, 11. The swat arm 27 and coils 30 and 31 and extensions 32 and 33 are constructed so that the arm 27 is not spring loaded when the arm and trigger 24 are in the cocked positions in which they are shown in FIG. 1 but said arm 27 will be placed under a spring load ample for swatting purposes when the trigger 24 is squeezed back into the position in which it is shown in FIG. 3. The strength of the return spring 37 is sufficient to insure return of the swat arm 27 and trigger 24 to the cocked position shown in FIG. 1 after each swatting stroke.

A latch member 42 formed of flat metal, preferably steel, is disposed in the receptacle of said latch member arm 40. The lower end portion of said latch member 42 is pivotally connected with the handle parts 10 and 11 by two spaced apart perforated ears 43 which fit over two outwardly protruding stud pins 44 in said handle parts 10 and 11. The upper end of the latch member 42 is bent to provide thereon two spaced apart catch members 45 which hook over the shoulders 28 and 29 of the swat arm 27. A helical compression spring 57 is seated within a socketed boss 56 in the handle 10, 11 and exerts an outward pressure on the latch member 42 to yieldingly hold the catch members 45 in engagement with the shoulders 28 and 29.

A flat swat frame or pad 46 is secured to the upper end of the swat arm 27. This swat pad is preferably formed of mesh type plastic material and has fairly large openings 47 in it. One preferred way to secure the pad 46 to the swat arm 27 is to provide in an end member 48 of said pad two spaced apart holes 49 into which two spaced apart terminal prongs 50 on the upper end of the arm 27 can be inserted. Preferably the prongs 50 fit the holes 49 tight enough so the parts 27 and 46 will not become disconnected when in use but can be readily pulled apart if desired. Also preferably the prongs 50 have a slight rearward incline relative to the swat arm 27 for better positioning and balance of said arm.

The swat pad 46 is adapted to have a disposable envelope or bag 51 on it when it is in use. The bag 51 can be formed of paper or like material and can be perforated if desired. Said bag 51 is shaped to fit the pad 46 snugly enough so it will not become displaced or come off while the swatter is in use but can be easily removed and disposed of if it becomes soiled.

When this device is not in use the parts thereof will normally be held, by the return spring 37, in the relative positions in which they are shown in FIG. 1 with the swat arm 27 inclined rearwardly at a substantial angle relative to the longitudinal axis of the handle 10, 11. In this position the arm 27 will rest against the upper edge 52 of the back wall 21 and the catch members 45 on the latch member 42 will be hooked over the shoulders 28 and 29.

In using the device the user grips the handle 10, 11 as he would a pistol and with his forefinger squeezes and exerts a pull on the trigger 24 moving it from a position such as shown in FIG. 1 to a position such as shown in FIG. 3. As said trigger is moved rearwardly the coils 30 and 31 which actuate the swat arm 27 are tensioned but the catch members 45 hold the swat arm 27 in its cooked position until the trigger 24 contacts and tiltingly moves the latch member 42 enough to cause the catch members 45 to release the shoulders 28 and 29, whereupon the coils 30 and 31 impart a snappy swatting stroke to the swat arm 27 and pad 46. Squeezing the trigger 24 back against the handle 10, 11 also tensions the return spring 37 and as soon as the trigger 24 is released said return spring 37 moves it outwardly and moves the swat arm 27 and pad 46 back to the cocked position. Thus the swat arm 27 and pad 46 do not need to be manually moved to a cocked position preparatory to use but are always in the cocked position except when making a stroke and all that is necessary in swatting a fly is to pick the device up, hold it in a proper striking position relative to the fly and squeeze the trigger 24. Providing for energizing the coils 30 and 31 by exerting a squeezing force on the trigger 24 makes the device easy and convenient and fast to use. Positioning the swatter for swatting a sitting fly and the small amount of finger movement required for squeezing the trigger to spring load and release the swat arm usually will not cause the fly to take to the air and the movement of the swat arm and pad, when they are released, is fast enough so the fly can not escape the pad 46 if the device is properly held.

The foregoing description and accompanying drawings clearly disclose a preferred form of my invention but it will be understood that this disclosure is merely illustrative and that changes may be made within the scope of the following claims.

I claim:

1. In a fly swatter, a handle; a swat arm having one end portion pivotally mounted in said handle and having a swat pad on its other end portion, said swat arm being movable between a swatting position and a cocked position; a latch means in the handle positioned to hold said swat arm in its cocked position; a trigger pivoted in the handle; spring means connected between the trigger and the swat arm, said trigger constituting a means to free the spring of tension when the trigger is in a released position and to tension it by squeezing pivotal movement to impart swatting movement to the swat arm; and a return spring on the trigger and abutting a portion of the handle for urging the trigger and swat arm into a cocked position, said latch means being actuated by said trigger to release said swat arm when said trigger is squeezed into a fully retracted position.

2. A spring actuated fly swatter comprising a handle; a swat arm; a swat pad carried by the outer end portion of said swat arm; means pivotally connecting the inner end portion of said swat arm and said handle for swinging movement of the swat arm and pad relative to the handle between a retracted position and a swatting position; latch means in the handle for latching said swat arm in a retracted position; a trigger pivotally supported by said handle for movement toward and away from the handle between a released position spaced from the handle and a latch releasing position close to the handle; return spring means urging said trigger outwardly from said handle toward its released position; and swat arm actuating spring means interposed between and reacting between the trigger and the swat arm for moving the swat arm from a retracted to a swatting position in response to movement of said trigger from its released position in which it is spaced from said swat arm to its spring loading and latch releasing position in which it is close to said handle.

3. The apparatus as claimed in claim 2 in which the swat arm is in the form of two twisted together spring wires; and in which the swat arm actuating spring means is in the form of two spring coils provided in the pivoted end portions of the respective wires which form the swat arm.

4. The apparatus as claimed in claim 2 in which the swat arm is formed of two twisted together spring wires which are spread apart in forked relation near their inner ends and provide two shoulders for engagement by the catch member, said spread apart portions of said wires each having a spring coil provided therein beyond the shoulder thereof, said spring coils serving as the swat arm actuating spring means.

5. The apparatus as claimed in claim 4 in which the swat arm and the trigger are mounted on a common pivot and in which each of the spring coils has a terminal arm protruding therefrom and engaging with the trigger.

6. The apparatus as claimed in claim 2 in which a disposable envelope of pliable material is fitted over and encloses said pad and is readily applicable thereto and removable therefrom.

References Cited by the Examiner

UNITED STATES PATENTS

| | | | |
|---|---|---|---|
| 1,164,596 | 12/1915 | Cox | 43—135 |
| 1,188,315 | 6/1916 | Pickl | 46—189 |
| 1,304,074 | 5/1919 | Limoges | 43—135 |
| 1,861,688 | 6/1932 | Crawford | 43—135 |
| 2,189,360 | 2/1940 | Haviland | 43—135 |
| 2,545,358 | 3/1951 | Jenkins | 124—27 |
| 2,641,242 | 6/1953 | Dickson | 124—36 X |
| 2,699,008 | 1/1955 | Tyler | 42—57 |

SAMUEL KOREN, *Primary Examiner.*

ALDRICH F. MEDBERY, *Examiner.*